US012664303B2

(12) United States Patent
  Hu

(10) Patent No.: US 12,664,303 B2
(45) Date of Patent: Jun. 23, 2026

(54) DATA SHARING METHOD AND ELECTRONIC DEVICE

(71) Applicant: VIVO MOBILE COMMUNICATION CO., LTD., Guangdong (CN)

(72) Inventor: Zhiyuan Hu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 158 days.

(21) Appl. No.: 18/425,431

(22) Filed: Jan. 29, 2024

(65) Prior Publication Data

US 2024/0169092 A1      May 23, 2024

Related U.S. Application Data

(63) Continuation of application No. PCT/CN2022/107369, filed on Jul. 22, 2022.

(30) Foreign Application Priority Data

Jul. 29, 2021    (CN) .......................... 202110862460.5

(51) Int. Cl.
  *G06F 21/62*          (2013.01)
(52) U.S. Cl.
  CPC ................................ *G06F 21/6245* (2013.01)
(58) Field of Classification Search
  None
  See application file for complete search history.

(56) References Cited

U.S. PATENT DOCUMENTS

| | | | | |
|---|---|---|---|---|
| 11,270,276 B1 * | 3/2022 | Magerkurth | ........ | H04L 63/0428 |
| 2021/0119764 A1 | 4/2021 | Meghji | | |

FOREIGN PATENT DOCUMENTS

| | | | | |
|---|---|---|---|---|
| CN | 108985089 A | 12/2018 | | |
| CN | 111709056 A | 9/2020 | | |
| CN | 111797415 A | 10/2020 | | |
| CN | 111914269 A | 11/2020 | | |
| CN | 111916173 A | 11/2020 | | |
| CN | 111935080 A | 11/2020 | | |
| CN | 111950020 A | 11/2020 | | |
| CN | 113486122 A | 10/2021 | | |
| KR | 20190068542 A | * 6/2019 | .......... | G06Q 20/389 |
| WO | 2020133346 A1 | 7/2020 | | |

* cited by examiner

*Primary Examiner* — Ali S Abyaneh
*Assistant Examiner* — Felicia Farrow
(74) *Attorney, Agent, or Firm* — Price Heneveld LLP

(57) ABSTRACT

A data sharing method may be applied to a server side, and the method includes: receiving a data access request sent by a first client side, where the data access request includes first data-sharing information, and the first data-sharing information is used to describe to-be-accessed data; and sending first storage information to the first client side in a case that the first client side meets a first access condition in a first smart contract, where the first smart contract belongs to a first block in a blockchain, and the first storage information is used to represent information that is corresponding to the to-be-accessed data and that is stored in a storage server.

7 Claims, 8 Drawing Sheets

Receive a data access request sent by a first client side — 201

Send first storage information to the first client side in a case that the first client side meets a first access condition in a first smart contract — 202

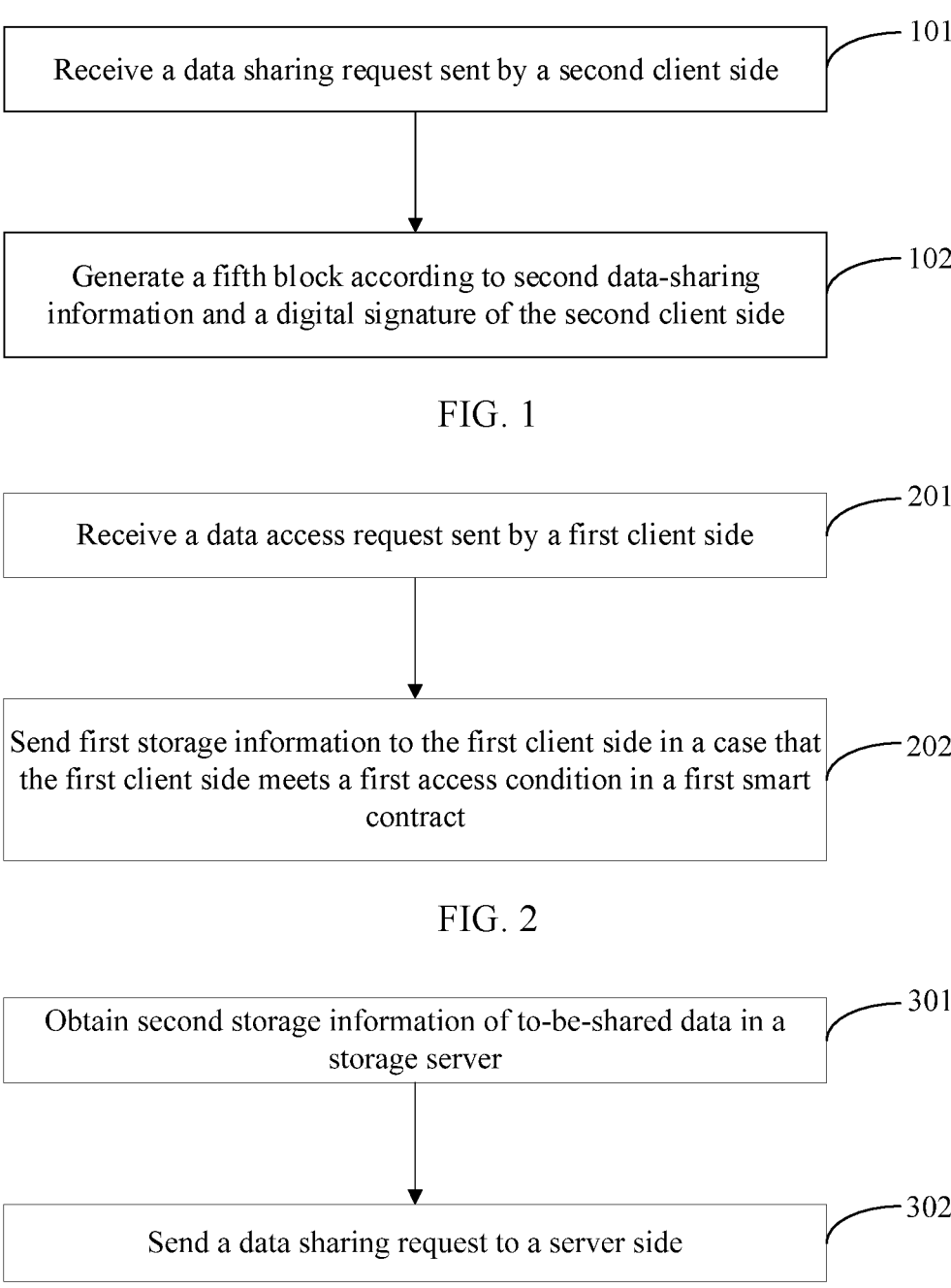

| Receive a data sharing request sent by a second client side | 101 |

↓

| Generate a fifth block according to second data-sharing information and a digital signature of the second client side | 102 |

FIG. 1

| Receive a data access request sent by a first client side | 201 |

↓

| Send first storage information to the first client side in a case that the first client side meets a first access condition in a first smart contract | 202 |

FIG. 2

| Obtain second storage information of to-be-shared data in a storage server | 301 |

↓

| Send a data sharing request to a server side | 302 |

FIG. 3

| Send a data access request to a server side | 401 |

| Receive first storage information that is of to-be-accessed data and that is sent by the server side | 402 |

| Obtain the to-be-accessed data according to the first storage information | 403 |

1200

1300

DATA SHARING METHOD AND ELECTRONIC DEVICE

CROSS-REFERENCE TO RELATED APPLICATIONS

This application is a continuation application of International Application No. PCT/CN2022/107369, filed on Jul. 22, 2022. International Application No. PCT/CN2022/107369 claims priority to Chinese Patent Application No. 202110862460.5, filed on Jul. 29, 2021 in China. Each of the above-listed applications is incorporated herein by reference in its entirety.

TECHNICAL FIELD

This application relates to the field of blockchain technologies, and specifically relates to a data sharing method and an electronic device.

BACKGROUND

Big data is known as the future "new oil". At present, whoever has more data resources will have more markets and users in this era of big data. However, while enjoying the convenience and benefits brought by data, people also bear risks of personal information leakage and disturbance of personal life. Therefore, advanced technologies and solutions need to be introduced to achieve secure sharing of data resources.

Currently, a manner of sharing data resources is generally uploading the data resources to a third-party storage server by a data provider, and a data demander downloads the corresponding resources by using the storage server. However, there may be security risks such as data leakage and data tampering when data resources are shared by using a third-party platform. It can be learned that security of the current data sharing method is relatively low.

SUMMARY

According to a first aspect, an embodiment of this application provides a data sharing method. The method is applied to a server side and includes:

receiving a data access request sent by a first client side, where the data access request includes first data-sharing information, and the first data-sharing information is used to describe to-be-accessed data; and sending first storage information to the first client side in a case that the first client side meets a first access condition in a first smart contract, where the first smart contract belongs to a first block in a blockchain, and the first storage information is used to represent information that is corresponding to the to-be-accessed data and that is stored in a storage server.

According to a second aspect, an embodiment of this application provides a data sharing method. The method is applied to a server side and includes:

receiving a data sharing request sent by a second client side, where the data sharing request includes second data-sharing information and a digital signature of the second client side, and the second data-sharing information is used to describe to-be-shared data; and generating a fifth block according to the second data-sharing information and the digital signature of the second client side, where the fifth block includes a third smart contract, the third smart contract is used to instruct to output second storage information in a case that a second access condition in the third smart contract is met, and the second storage information is used to represent information that is corresponding to the to-be-shared data and that is stored in a storage server.

According to a third aspect, an embodiment of this application provides a data sharing method. The method is applied to a first client side and includes:

sending a data access request to a server side, where the data access request includes first data-sharing information, and the first data-sharing information is used to describe to-be-accessed data;

receiving first storage information that is of the to-be-accessed data and that is sent by the server side based on a first smart contract, where the first smart contract belongs to a first block in a blockchain, and the first storage information is used to represent information that is corresponding to the to-be-accessed data and that is stored in a storage server; and obtaining the to-be-accessed data according to the first storage information.

According to a fourth aspect, an embodiment of this application provides a data sharing method. The method is applied to a second client side and includes:

obtaining second storage information of to-be-shared data in a storage server, where the second storage information is used to represent information corresponding to the to-be-shared data in the storage server; and sending a data sharing request to a server side, where the data sharing request includes second data-sharing information, and the second data-sharing information is generated based on the second storage information and is used to describe the to-be-shared data.

According to a fifth aspect, an embodiment of this application provides a data sharing apparatus. The data sharing apparatus is a server side, and the data sharing apparatus includes:

a first receiving module, configured to receive a data access request sent by a first client side, where the data access request includes first data-sharing information, and the first data-sharing information is used to describe to-be-accessed data; and a first sending module, configured to send first storage information to the first client side in a case that the first client side meets a first access condition in a first smart contract, where the first smart contract belongs to a first block in a blockchain, and the first storage information is used to represent information that is corresponding to the to-be-accessed data and that is stored in a storage server.

According to a sixth aspect, an embodiment of this application provides a data sharing apparatus. The data sharing apparatus is a server side, and the data sharing apparatus includes:

a third receiving module, configured to receive a data sharing request sent by a second client side, where the data sharing request includes second data-sharing information and a digital signature of the second client side, and the second data-sharing information is used to describe to-be-shared data; and a fourth generation module, configured to generate a fifth block according to the second data-sharing information and the digital signature of the second client side, where the fifth block includes a third smart contract, the third smart contract is used to instruct to output second storage information in a case that a second access condition in the third smart contract is met, and the second storage information is used to represent information that is corresponding to the to-be-shared data and that is stored in a storage server.

According to a seventh aspect, an embodiment of this application provides a data sharing apparatus. The data sharing apparatus is a first client side, and the data sharing apparatus includes:

a fourth sending module, configured to send a data access request to a server side, where the data access request includes first data-sharing information, and the first data-sharing information is used to describe to-be-accessed data;

a fourth receiving module, configured to receive first storage information that is of the to-be-accessed data and that is sent by the server side based on a first smart contract, where the first smart contract belongs to a first block in a blockchain, and the first storage information is used to represent information that is corresponding to the to-be-accessed data and that is stored in a storage server; and a first obtaining module, configured to obtain the to-be-accessed data according to the first storage information.

According to an eighth aspect, an embodiment of this application provides a data sharing apparatus. The data sharing apparatus is a second client side, and the data sharing apparatus includes:

a second obtaining module, configured to obtain second storage information of to-be-shared data in a storage server, where the second storage information is used to represent information corresponding to the to-be-shared data in the storage server; and a sixth sending module, configured to send a data sharing request to a server side, where the data sharing request includes second data-sharing information, and the second data-sharing information is generated based on the second storage information and is used to describe the to-be-shared data.

According to a ninth aspect, an embodiment of this application provides an electronic device. The electronic device includes a processor, a memory, and a program or an instruction that is stored in the memory and that can be run on the processor, and the program or the instruction is executed by the processor to implement the steps of the method according to the first aspect.

According to a tenth aspect, an embodiment of this application provides a readable storage medium. The readable storage medium stores a program or an instruction, and the program or the instruction is executed by a processor to implement the steps of the method according to at least one of the first aspect, the second aspect, and the third aspect.

According to an eleventh aspect, an embodiment of this application provides a chip. The chip includes a processor and a communication interface, the communication interface is coupled to the processor, and the processor is configured to run a program or an instruction to implement the method according to at least one of the first aspect, the second aspect, and the third aspect.

According to a twelfth aspect, an embodiment of this application provides a computer program product. The computer program product is stored in a non-transient storage medium, and the computer program product is executed by at least one processor to implement the method according to at least one of the first aspect, the second aspect, and the third aspect.

BRIEF DESCRIPTION OF DRAWINGS

FIG. 1 is a first flowchart of steps of a data sharing request according to an embodiment of this application;

FIG. 2 is a second flowchart of steps of a data sharing request according to an embodiment of this application;

FIG. 3 is a third flowchart of steps of a data sharing request according to an embodiment of this application;

DESCRIPTION OF EMBODIMENTS

Figure 4:
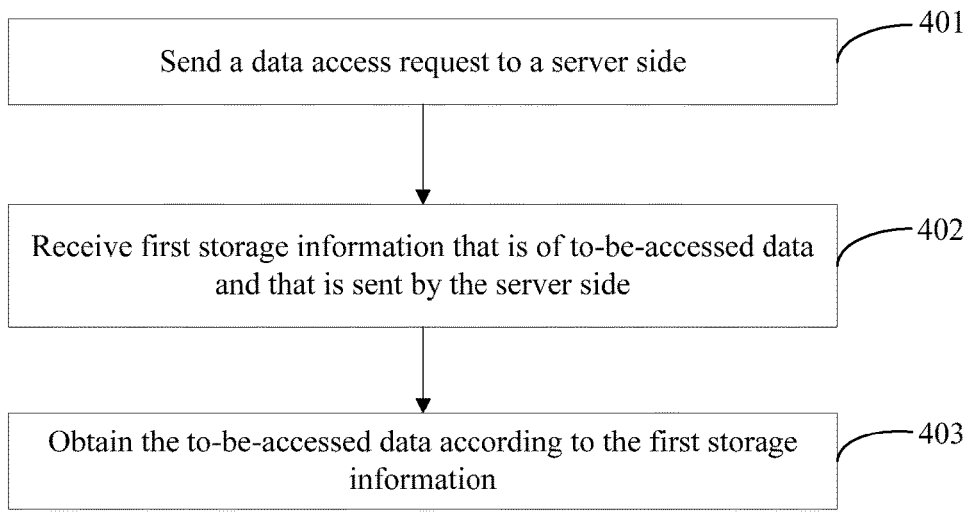
FIG. 4 is a fourth flowchart of steps of a data sharing request according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, the data sharing method provided in the embodiments of this application is described in detail by using specific embodiments and application scenarios thereof.

In the embodiments of this application, there may be a data user, a data provider, and a data sharing platform. The data provider may implement data uploading and sharing by interacting with the data sharing platform. A data demander may implement data downloading and use by interacting with the data sharing platform. It should be understood that the foregoing data sharing platform is connected to a block-chain network, and it may be learned from a nature of a blockchain that a record included in the block cannot be modified. Therefore, data sharing is implemented by using the blockchain, so that a risk that data is damaged or tampered with can be reduced.

Based on this, referring to FIG. 1, this application provides a data sharing method. The method is applied to a server side and includes:

Step 101: A server side receives a data sharing request sent by a second client side, where the data sharing request includes second data-sharing information and a digital signature of the second client side, and the second data-sharing information is used to describe to-be-shared data.

Step 102: The server side generates a fifth block according to the second data-sharing information and the digital signature of the second client side, where the fifth block includes a third smart contract, the third smart contract is used to instruct to output second storage information in a case that a second access condition in the third smart contract is met, and the second storage information is used to represent information that is corresponding to the to-be-shared data and that is stored in a storage server.

In this embodiment of this application, the server side may be a data sharing platform, and is connected to a blockchain network. The second client side may be a data provider, and may be specifically a mobile electronic device or a non-mobile electronic device. For example, the mobile electronic device may be a mobile phone, a tablet computer, a notebook computer, a palmtop computer, an in-vehicle electronic device, or a wearable device. No enumeration is provided in this embodiment.

The second client side may be communicatively connected to the server side, so that the data sharing request can be sent to the server side. The data sharing request may be based on an input performed by a user, for example, a key for selecting and publishing data on the first client side. Certainly, the data sharing request may be triggered by itself according to a preset condition. This is not limited herein.

It can be understood that, in the foregoing step 101, to implement data sharing, the data sharing request may carry the second data-sharing information and the digital signature of the second client side. The digital signature of the second client side is a character string generated by the second client side, to prove authenticity of information sent by the second client side.

The second data-sharing information may be used to describe the to-be-shared data. Specifically, the second data-sharing information may include identity information of the second client side, where the identity information of the second client side may include an identity ID of the second client side, and may further include a public key of the second client side, so that the server side determines a client side that sends the data sharing request. Certainly, the identity information may further include industry information, company information, and personal information of the second client side, to represent an industry and a company represented by the second client side, and information about a user of the second client side, and may be used to publish shared data at the server side, so that a data demander needs to view related information of the data provider. The identity information may be filled in by the user of the second client side. For example, when an account is registered, the identity information is filled in. Details are not described herein.

The second data-sharing information may further include data storage information, data introduction information, and sharing policy information, where the data storage information may include a storage address of the to-be-shared data. If the to-be-shared data is ciphertext data, an identifier ID of a ciphertext, an ID of a key, a storage address of the key, or the like, the data demander obtains the to-be-shared data according to the data storage information.

The data introduction information is used to represent an attribute of the to-be-shared data, for example, a category, an introduction, a nature, a usage, and a price of the to-be-shared data, so that the data demander determines required data according to the data introduction information.

The sharing policy information is used to represent a user group that the second client side intends to share. For example, the sharing policy information may include target industry information, target crowd information, and the like, so that the server side can determine, according to the sharing policy information, whether the data demander can obtain the to-be-shared data.

In some embodiments, the second data-sharing information may further include a price and payment billing information, to represent benefits that the data provider intends to obtain for the to-be-shared data.

It can be understood that all information included in the second data-sharing information may be filled in by the second client side. For example, an information template may be created in an application corresponding to the second client side for the user of the second client side to fill in, or may be automatically generated by the second client side according to obtained data. This is not limited herein.

After the server side receives the data sharing request, because the server side may be connected to the blockchain network, in the foregoing step 102, the server side may form a blockchain transaction according to the second data-sharing information and the digital signature of the second client side, where the blockchain transaction is used to implement sharing of the to-be-shared data corresponding to the second data-sharing information. Then, the server side may send the blockchain transaction to an existing blockchain infrastructure platform, and generate the fifth block based on an existing open source blockchain platform (for example, Hyperledger Fabric or Ethereum Quorum), where the fifth block includes the third smart contract corresponding to the second data-sharing information; and publishes the generated fifth block to each server node that accesses the blockchain network, to notify the new data sharing request.

It can be understood that the digital signature of the second client side is in a one-to-one correspondence with the second data-sharing information, that is, whenever the second client side needs to access one piece of to-be-accessed data, a data access request that includes a digital signature and the second data-sharing information needs to be sent once. For different data access requests, digital signatures of the second client side are also different.

The third smart contract is generated based on the second data-sharing information, and may include an access condition determined according to the second data-sharing information. The server side may output the second storage information corresponding to the to-be-shared data in a case that the data demander meets the second access condition in the third smart contract. The second storage information is generated based on the second data-sharing information, and is used to indicate the information that is corresponding to the to-be-shared data and that is stored in the storage server, such as address information and key information. The storage server may be a server responsible for a storage function in the foregoing server side, or may be an external storage server. The to-be-shared data may be stored in the storage server after being encrypted. This is not limited herein.

It should be noted that both the blockchain transaction and the third smart contract are in a one-to-one correspondence with the data access request, that is, each time the server side receives a data access request that includes the second data-sharing information and a digital signature data of the second client side, one blockchain transaction may be generated according to the second data-sharing information and the digital signature of the second client side, and one third smart contract is generated. To avoid a waste of blockchain resources, the fifth block may alternatively include a plurality of third smart contracts. That is, after receiving N data access requests, the server side may generate N blockchain transactions, and the finally integrated fifth block includes N third smart contracts. It can be understood that N is a positive integer, and a value of N may be determined according to a maximum capacity of the fifth block. In a case that N is a plurality of, the fifth block may include a plurality of smart contracts, thereby avoiding a waste of a block capacity.

The manner of forming the fifth block may be set according to an existing block generation manner of the open source blockchain platform (for example, Hyperledger Fabric or Ethereum Quorum). This is not further described herein.

In this embodiment of this application, the server side may receive the data sharing request sent by the data provider, that is, the second client side, and generate the fifth block according to the second data-sharing information and the digital signature of the second client side that are carried in the data sharing request, where the fifth block includes the third smart contract. The server side may output the second storage information corresponding to the to-be-shared data in a case that the second access condition in the third smart contract is met, so that the data demander obtains the to-be-shared data for use. Because content stored in a block in the blockchain cannot be tampered with, the third smart contract included in the block has relatively high stability and security. In addition, the smart contract may output the second storage information by itself in a case that the access condition is met, thereby avoiding a security risk that a third-party platform intervenes in data sharing and improving data sharing security.

Optionally, before the foregoing step 102, the second client side may first perform mutual authentication with the server side, and an authentication credential may be a digital certificate or a key. After the authentication succeeds, the server side may further query, according to the identity information of the second client side, whether the second client side has permission to publish data sharing. In a case that the second client side has permission to publish data sharing, the fifth block is generated, so that an illegal or an unauthorized user can be prevented from acting as the data provider, thereby improving data sharing security.

Optionally, the second data-sharing information includes identity information of the second client side and data introduction information. After the foregoing step 102, the method further includes:

generating second address information used to indicate the third smart contract; and sending the identity information of the second client side, the data introduction information, and the second address information to a subscribed client side.

In this embodiment of this application, after generating the fifth block including the third smart contract, the server side may generate the second address information indicating the third smart contract. The second address information may be a uniform resource locator (URL) or a uniform resource identifier (URI) address. After receiving the second address information, the client side may perform the third smart contract through an input performed by a user, for example, by clicking a link to an access address, so that the second storage information can be output in a case that the client side meets the second access condition in the third smart contract.

It should be noted that the identity information of the second client side and the data introduction information in the second data-sharing information may be sent to the subscribed client side together with the second address information, and the client side may display the identity information of the second client side and the data introduction information, so that the user learns a publisher of the to-be-shared data and a related attribute and type of the to-be-shared data, to determine whether the to-be-shared data needs to be accessed.

The foregoing information sending procedure may be implemented based on a publish-subscribe mode. The server side serves as a publisher, and the subscribed client side serves as a subscriber. Details are not described herein.

Referring to FIG. 2, this application further provides a data sharing method. The method is applied to a server side and includes:

Step 201: A server side receives a data access request sent by a first client side, where the data access request includes first data-sharing information, and the first data-sharing information is used to describe to-be-accessed data.

Step 202: The server side sends first storage information to the first client side in a case that the first client side meets a first access condition in a first smart contract.

The first smart contract belongs to a first block in a blockchain, and the first storage information is used to represent information that is corresponding to the to-be-accessed data and that is stored in a storage server.

In the foregoing step 201, the first client side may be a data demander, and may be specifically a mobile electronic device or a non-mobile electronic device. For example, the mobile electronic device may be a mobile phone, a tablet computer, a notebook computer, a palmtop computer, an in-vehicle electronic device, or a wearable device. No enumeration is provided in this embodiment.

The first client side may be communicatively connected to the server side, so that the data access request can be sent to the server side. The data access request may be based on an input performed by a user, for example, a key for selecting and publishing data on the first client side. Certainly, the data access request may be triggered by itself according to a preset condition. This is not limited herein.

It can be understood that the data access request may carry identity information of the first client side and the first data-sharing information, where the identity information of the first client side may include an identity ID of the first client side, so that the server side determines a client side that sends the data access request. Certainly, the identity information may further include industry information, company information, and personal information of the first client side, to represent an industry and a company represented by the first client side, and information about a user of the first client side. The identity information may be filled in by the user of the first client side. For example, when an account is registered, the identity information is filled in, so that the server side determines an access permission of the first client side.

The first data-sharing information may be generated according to the second data-sharing information in the foregoing embodiment. In a specific embodiment, the server side may display, on a page, data introduction information sent by the data provider and an address link indicating a smart contract. If the user needs to access to-be-accessed data corresponding to the data introduction information, the user may click the address link. In this case, the server side receives the data access request sent by the first client side. The first data-sharing information is generated according to the second data-sharing information filled in by the data provider, and the to-be-accessed data may be determined. Certainly, in some embodiments, the first data-sharing information may be information that is filled in by the user of the first client side and that is used to determine to-be-accessed data. This is not limited herein.

In the foregoing step 202, the server side may determine, according to the identity information of the first client side, whether the first client side meets the first access condition in the first smart contract. The first access condition in the first smart contract may be determined by the data provider and is used to represent a user group that the data provider intends to share. For example, the first access condition may limit a target industry and a target population, so that whether the first client side meets the first access condition can be determined according to the identity information of the first client side. In a case that the first client side meets the first access condition, the first storage information corresponding to the to-be-accessed data is sent to the first client side according to the first smart contract. A manner of generating the first block to which the first smart contract belongs may be similar to that in the foregoing embodiment. To avoid repetition, details are not described herein again.

It should be understood that the first storage information is used to represent the information that is corresponding to the to-be-accessed data and that is stored in the storage server. Therefore, the first client side may obtain the to-be-accessed data according to the first storage information.

In this embodiment of this application, the server side may receive the data access request sent by the first client side, and send, according to the first data-sharing information carried in the data access request, the first storage information corresponding to the to-be-accessed data to the first client side in a case that the first client side meets the first access condition in the first smart contract. Because content stored in a block in the blockchain cannot be tampered with, the first smart contract included in the block has relatively high stability and security. In addition, the smart contract may output the first storage information by itself in a case that the first access condition is met, thereby avoiding a security risk that a third-party platform intervenes in data sharing and improving data sharing security.

Optionally, before the foregoing step 202, the first client side may perform mutual authentication with the server side, and an authentication credential may be a digital certificate or a key. After the authentication succeeds, the foregoing step 202 is performed, so that an illegal user can be prevented from acting as a data access party, thereby improving data sharing security.

Optionally, before the step of sending first storage information to the first client side, the method further includes:

in a case that the first client side meets the first access condition in the first smart contract, generating a second block according to the identity information of the first client side, the first data-sharing information, and the digital signature of the first client side, where the second block includes an access record corresponding to the to-be-accessed data.

In this embodiment of this application, in a case that the first client side meets the first access condition in the first smart contract, the server side may form a blockchain transaction according to the first data-sharing information, and the server side may send the blockchain transaction to an existing blockchain infrastructure platform, and generate the second block based on an existing open source blockchain platform (for example, Hyperledger Fabric or Ethereum Quorum), where the second block may include the access record corresponding to the to-be-accessed data, to facilitate query by the data provider or the data demander.

It should be noted that the block link transaction is in a one-to-one correspondence with the access record and the first data-sharing information, that is, each time the server side receives one piece of first data-sharing information, one block link transaction may be generated according to the first data-sharing information, and one access record is generated. To avoid a waste of blockchain resources, the second block may include a plurality of access records, that is, after receiving M pieces of first data-sharing information, the server side may generate M blockchain transactions, and the finally integrated second block includes M access records.

It can be understood that M is a positive integer, and a value of M may be determined according to a maximum capacity of the second block. In a case that M is greater than 1, the second block may include a plurality of access records, thereby avoiding a waste of a block capacity.

Optionally, the first storage information includes first key information and first address information, and the foregoing step 202 includes:

in a case that the first client side meets the first access condition in the first smart contract, generating the first key information corresponding to the to-be-accessed data, and obtaining the first address information; and sending the first key information and the first address information to the first client side, where the first key information is used to obtain an access permission of the storage server, and the first address information is used to indicate a storage address of the to-be-accessed data.

In this embodiment of this application, the first storage information may include the first key information and the first address information. The first key information may be understood as an access token of the storage server. When the first client side accesses the storage server according to the first address information, the storage server may verify the first key information. In a case that the verification succeeds, the first client side may obtain the to-be-accessed data by using the storage server.

Specifically, in some embodiments, the storage server may include a key storage server and a data storage server. The to-be-accessed data may be stored in the data storage server after being encrypted. In this case, the first key information may further include address information of the key storage server. The first client side may first obtain an access permission of the key storage server by using the first key information, and then obtain, in the key storage server, second key information used to decrypt the to-be-accessed data, and then obtain encrypted access data by accessing the data storage server, and decrypt the encrypted to-be-accessed data by using the second key information.

In this embodiment of this application, the first storage information may include the first key information and the first address information, so that the storage server can verify the first key information to determine whether the first client side can access the to-be-accessed data, thereby further improving data sharing security.

Optionally, the data access request further includes identity information of the first client side and a digital signature of the first client side, and before the step of sending first storage information to the first client side, the method further includes:

in a case that the first client side meets the first access condition in the first smart contract, generating a third block according to the identity information of the first client side, the first data-sharing information, and the digital signature of the first client side, where the third block includes a second smart contract, and the second smart contract is associated with the first smart contract and is used to instruct to send the first storage information to the first client side in a case that payment information sent by the first client side is received;

sending billing information associated with the to-be-accessed data to the first client side; and after the payment information sent by the first client side is received, generating a fourth block according to the payment information and the digital signature of the first client side, where the fourth block includes a payment record corresponding to the payment information.

The foregoing step 202 includes:

sending the first storage information to the first client side in a case that the first client side meets the first access condition in the first smart contract and the payment information sent by the first client side is received.

In this embodiment of this application, the server side may implement a payment and charging function during data sharing, so that the data provider obtains benefits from the data demander. That is, when sending the data-sharing information to the server side, the data demander may send the billing information associated with the to-be-accessed data, so that the server side can send the billing information to the first client side after receiving the data access request.

Specifically, in a case that the server side determines that the first client side meets the first access condition in the first smart contract, the server side may determine the to-be-accessed data according to the first data-sharing information, and generate a blockchain transaction by using the identity information of the first client side, the first data-sharing information, and the digital signature of the first client side. The server side may send the blockchain transaction to an existing blockchain infrastructure platform, and generate the third block based on an existing open source blockchain platform (for example, Hyperledger Fabric or Ethereum Quorum). The third block may include the second smart contract, and the second smart contract is associated with the first smart contract and is used to instruct to send the first storage information to the first client side in a case that the payment information sent by the first client side is received.

Similarly to the foregoing embodiment, the second smart contract is in a one-to-one correspondence with the blockchain transaction and the first data-sharing information. In addition, the third block may include one or more second smart contracts. In a case that the server side receives a plurality of pieces of first data-sharing information, a plurality of blockchain transactions may be generated, and the plurality of second smart contracts are integrated into the third block, to improve utilization of the block and avoid a waste of a block capacity. Details are not described herein again.

After the server side receives the payment information sent by the first client side, it indicates that payment is completed. In this case, the server side may send the first storage information to the first client side according to the second smart contract. In addition, to facilitate the data provider or the first client side to query a payment record, the server side may generate the fourth block according to both the payment information and the digital signature of the first client side. The fourth block includes the payment record corresponding to the payment information. A manner of generating the fourth block is similar to the manner of generating the first block to the third block in the foregoing embodiment. To avoid repetition, details are not described herein again.

In this embodiment of this application, the server side can implement a payment and charging function during data sharing, thereby improving user experience.

Correspondingly, referring to FIG. 3, an embodiment of this application further provides a data sharing method. The method is applied to a second client side and includes:

Step 301: A second client side obtains second storage information of to-be-shared data in a storage server, where the second storage information is used to represent information corresponding to the to-be-shared data in the storage server.

Step 302: The second client side sends a data sharing request to a server side, where the data sharing request includes second data-sharing information, and the second data-sharing information is generated based on the second storage information and is used to describe the to-be-shared data.

In the foregoing step 301, the second client side may first register with the storage server, to obtain the second storage information corresponding to the to-be-shared data. The foregoing step 302 is corresponding to the foregoing step 101. In the foregoing step 302, the second client side may send the data sharing request to the server side, where the data sharing request includes the second data-sharing information. The second data-sharing information may include the second storage information, and may further include other information described in the foregoing method embodiment. Details are not described herein again.

In this embodiment of this application, after obtaining the second storage information of the to-be-shared data in the storage server, the second client side may send the data sharing request to the server side. Because the data sharing request includes the second data-sharing information used to describe the to-be-shared data, the server side may create a block according to the second data-sharing information, and implement data sharing by using a blockchain technology, thereby improving data sharing security.

Optionally, the second storage information includes third key information and third address information, and before the foregoing step 301, the method further includes:

encrypting the to-be-shared data by using the third key information; and uploading the third key information and encrypted to-be-shared data to the storage server, where the third address information is used to indicate a storage address of the to-be-shared data.

In this embodiment of this application, the second client side may encrypt the to-be-shared data by using the third key information, and upload the encrypted to-be-shared data to the storage server.

Specifically, in some embodiments, the storage server may include a key storage server and a data storage server. The to-be-accessed data may be stored in the data storage server after being encrypted. The second client side may store the third key information in the key storage server, and store the encrypted to-be-shared data in the data storage server. After obtaining the third key information from the key storage server, a data demander needs to obtain the encrypted to-be-shared data from the data storage server, and decrypt the encrypted to-be-shared data by using the third key information, thereby further improving data sharing security through data encryption.

Correspondingly, referring to FIG. 4, an embodiment of this application further provides a data sharing method. The method is applied to a first client side and includes:

Step 401: A first client side sends a data access request to a server side, where the data access request includes first data-sharing information, and the first data-sharing information is used to describe to-be-accessed data.

Step 402: The first client side receives first storage information that is of the to-be-accessed data and that is sent by the server side based on a first smart contract, where the first storage information is used to represent information that is corresponding to the to-be-accessed data and that is stored in a storage server, and the first smart contract belongs to a first block in a blockchain.

Step 403: The first client side obtains the to-be-accessed data according to the first storage information.

In this embodiment of this application, step 401 and step 402 correspond to step 201 and step 202. To avoid repetition, details are not described herein again.

In the foregoing step 403, the first storage information is used to represent the information that is corresponding to the to-be-accessed data and that is stored in the storage server, so that the first client side can obtain the to-be-accessed data according to the first storage information. It can be understood that the to-be-accessed data may be stored in an external storage server, to expand a storage capacity. The first client side may obtain the to-be-accessed data by interacting with the external storage server. This is not limited herein.

In this embodiment of this application, the first client side may send the data access request to the server side, and receive the first storage information that is of the to-be-accessed data and that is sent by the server side based on the first smart contract. Because content stored in a block in the blockchain cannot be tampered with, the first smart contract has relatively high stability and security. In addition, the first smart contract may output the first storage information by itself in a case that the access condition is met, thereby avoiding a security risk that a third-party platform intervenes in data sharing and improving data sharing security.

Optionally, the first storage information includes first key information and first address information, and the obtaining the to-be-accessed data according to the first storage information includes:

obtaining second key information in a case that the first key information is authenticated by the storage server;

obtaining encrypted to-be-accessed data according to the first address information; and decrypting the encrypted to-be-accessed data by using the second key information, to obtain the to-be-accessed data.

In this embodiment of this application, the first storage information may include the first key information and the first address information. The first key information may be understood as an access token of the storage server. When the first client side accesses the storage server according to the first address information, the storage server may verify the first key information. In a case that the verification succeeds, the first client side may obtain the to-be-accessed data by using the storage server.

Specifically, in some embodiments, the storage server may include a key storage server and a data storage server. The to-be-accessed data may be stored in the data storage server after being encrypted. The first client side may first obtain an access permission of the key storage server by using the first key information, and then obtain, from the key storage server, second key information used to decrypt the to-be-accessed data, and then obtain the encrypted access data by accessing the data storage server, and decrypt the encrypted to-be-accessed data by using the second key information.

In this embodiment of this application, the first storage information may include the first key information and the first address information, so that the storage server can verify the first key information to determine whether the first client side can access the to-be-accessed data, thereby further improving data sharing security.

Optionally, before the foregoing step 403, the method further includes:

receiving billing information sent by the server side; and performing a payment operation based on the billing information, and sending payment information to the server side.

This embodiment of this application corresponds to the foregoing method embodiment applied to the server side. To avoid repetition, a specific implementation process and beneficial effects are not described herein again.

In addition, an embodiment of this application further provides a data sharing system, including a server side, a first client side, and a second client side. The server side is configured to perform the steps of any one of the foregoing data sharing method embodiments applied to the server side, the first client side is configured to perform the steps of any one of the foregoing data sharing method embodiments applied to the first client side, and the second client side is configured to perform the steps of any one of the foregoing data sharing method embodiments applied to the second client side.

Through the server side, the first client side, and the second client side, an overall architecture of the data sharing method is constructed, which provides a complete, systematic, and implementable solution for data sharing based on a blockchain technology. Data sharing is implemented by using the data sharing system, thereby improving data sharing security.

Figure 5:
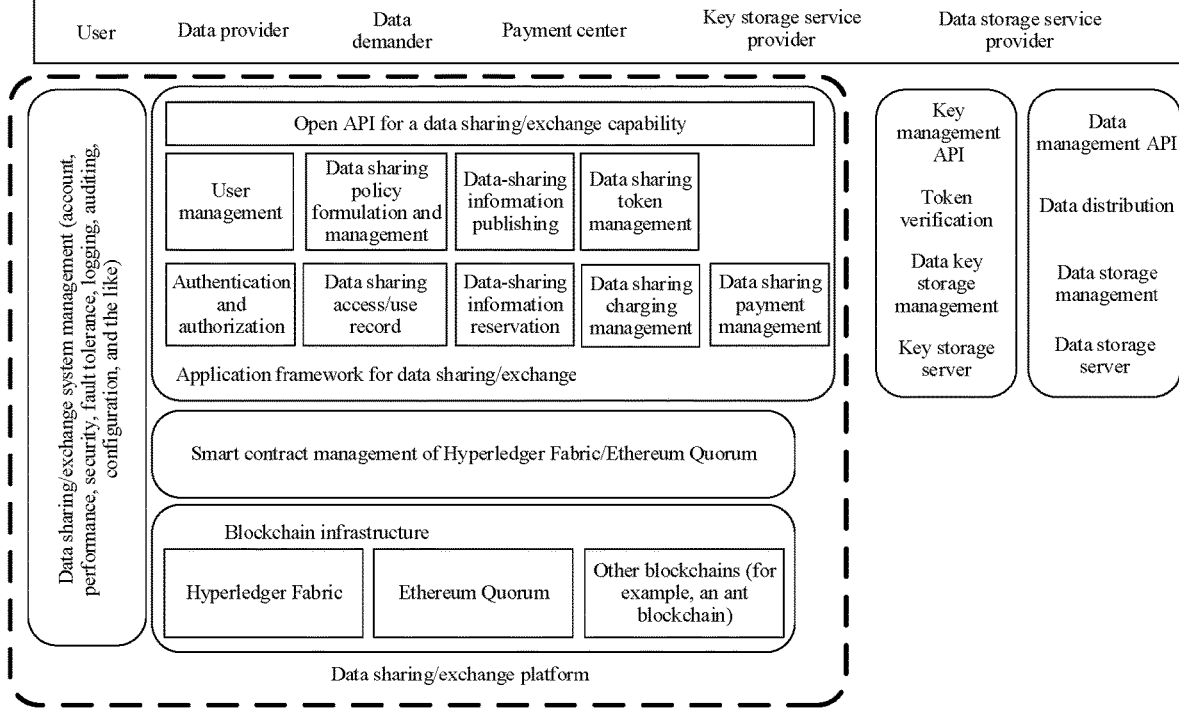
FIG. 5 is a system architecture diagram according to an embodiment of this application.

Based on the foregoing system, referring to FIG. 5, a specific implementation procedure of this embodiment of this application may be as follows:

The server side may include a user management module, an authentication and authorization module, a data sharing policy formulation and management module, a data sharing access record module, a data-sharing information publishing module, a data-sharing information reservation module, a data sharing token management module, a data sharing charging management module, and a data sharing payment management module.

The foregoing function modules may be implemented by using different server nodes in the server side, and the server side may enable capabilities of the foregoing function modules to be invoked by client side application software through an application programming interface (API).

The user management module is configured to: manage identity information of various users (for example, a data provider, a data demander, a payment center, a key storage service provider, and a data storage service provider), such as a user identity ID, a digital certificate, and a role, and manage query, addition, modification, and deletion procedures of various user accounts.

The authentication and authorization module is configured to: perform mutual authentication with a client side (for example, a data provider and a data demander) by using a password, a shared key, and a digital certificate; and check whether a user (for example, a data provider and a data demander) has permission to publish or access data and perform authorization.

The data sharing policy formulation and management module is configured to: receive a data access policy (including data-sharing information) and a corresponding digital signature that are defined by a second client side, and form a blockchain transaction according to the received data access policy and the corresponding digital signature; submit the transaction to lower-level modules "Blockchain infrastructure" and "Smart contract management" to form a data sharing smart contract and publish the smart contract to nodes of blockchain networks; notify the second client side and the data-sharing information publishing module that the data sharing smart contract is generated; and provide management of a data sharing policy record for the second client side, such as query and modification.

The data sharing access record module is configured to: receive a data access request from a first client side (including data demander information and to-be-accessed information), and check, according to a data sharing policy of to-be-accessed data, whether the user meets a condition of accessing shared data (for example, which industry can use the data and which user can use the data); form a blockchain system transaction according to received identity information of a data user, the to-be-accessed data information, and a digital signature; and submit the transaction to an underlying blockchain infrastructure module to form a record for accessing shared data, and publish the record to nodes of each blockchain network; or if the system supports charging and payment of data sharing/transaction, submit the transaction to an underlying blockchain infrastructure module and an underlying smart contract management module, to further form a corresponding charging smart contract, and publish the contract to nodes of each blockchain network; and notify the data sharing token management module that an access token needs to be generated; or if the system supports charging and payment of data sharing/transaction, notify "Data sharing charging management" that a new billing smart contract is generated; receive a notification including an access token from "Data sharing token management"; send the access token, and related information (for example, an address and a digital certificate) of a key storage server and a data storage server to the first client side; and provide management of a data sharing access record for the data user, such as query.

The data-sharing information publishing module is configured to: receive a notification from a data sharing policy formulation and management module, where the notification includes new data-sharing information; publish the new data-sharing information; and notify "Data-sharing information reservation" that there is new data-sharing information.

The data-sharing information reservation module is configured to: receive the notification from the data-sharing information publishing module, where the notification includes new data-sharing information; and send the new data-sharing information to a subscribed client side.

The data sharing token management module is configured to: receive a notification that an access token needs to be generated from the data sharing access record module; generate an access token for data access; and send the generated access token to the data sharing access record module.

The data sharing charging management module is configured to: receive a notification from the data sharing policy formulation and management module, and notify that a new charging smart contract is generated, where the notification includes new charging information; generate a new charging bill and sign the new charging bill; form a blockchain transaction between the charging bill and the signature; submit the transaction to an underlying blockchain infrastructure module to form a payment smart contract and publish the contract to nodes of each blockchain network; and notify the data sharing payment management module that the new payment smart contract is generated.

The underlying blockchain infrastructure module is generated based on an existing blockchain platform such as Hyperledger Fabric or Ethereum Quorum. Details are not described herein again.

The data sharing payment management module is configured to: receive a notification from the data sharing charging management module, and notify that a new payment smart contract is generated, where the notification includes new payment information; generate a new payment bill for payment, and sign the new payment bill; form a blockchain transaction between the payment bill and the signature; submit the transaction to an underlying blockchain infrastructure module to form a payment transaction record, and publish the record to nodes of each blockchain network; and notify transaction participants that new payment is completed.

The first client side may be a data demander, and an application and/or client side software in the first client side may have the following functions: reserving/subscribing for a published data sharing message; obtaining data-sharing information (for example, an identity of a data publisher, which industry can use the data, which user can use the data, and other attributes of the data such as a category, a content abstract, a nature, a usage, and a price) by searching an information publishing bar or reserving publishing information or through other's recommendation, and determining to-be-accessed data according to the published data-sharing information; before accessing shared data, performing mutual authentication with the authentication and authorization module at the server side; sending identity information to "Data sharing access record" of the server side, for example, an identify of a data user, a public key of the data user, and to-be-accessed data information such as an identify of a data publisher, a public key of the data publisher, a ciphertext identity ID, a key identity ID, and a digital signature for the identity information and the to-be-accessed data information; receiving a notification from "Data sharing access record", where the notification includes a key storage address, a data storage address, an access token, and the like; sending an access token to a token verification module of the key storage server according to the key storage address, to obtain a decryption key; requesting to obtain, according to an address stored in the ciphertext, data corresponding to the ciphertext identifier ID; decrypting the ciphertext data according to the obtained data decryption key, to obtain the to-be-accessed data; and managing an accessed sharing data record, such as query.

The second client side may be a data provider, and an application and/or client side software in the second client side may have the following functions: collecting raw data, and performing desensitization processing (for example, anonymity and deletion of privacy information such as a bank card number and an Alipay account number) without affecting data sharing quality; generating a data encryption key; encrypting shared data by using the data encryption key; storing a ciphertext and an encryption key of the shared data securely on a local or remote server; performing mutual authentication with the authentication and authorization module at the server side; and filling in to-be-published data-sharing information according to the data sharing policy formulation and management module at the server side, for example, an ID of a data publisher.

In addition, optionally, the foregoing system may further include a key storage server, and the key storage server includes:

a token verification module, configured to: receive an access token from the first client side, and perform identity authentication on the first client side; and verify validity of the access token. Optionally, during verification of the token, the token verification module of the key storage server may need to communicate with the data sharing token management module, and send a verification result to a data key storage management module; and a data key storage management module, configured to: receive a request from the second client side, and store a data encryption key; perform identity authentication on the second client side; securely store the encryption keys; notify the second client side that the encryption key is stored; receive a notification from the token verification module, where the notification indicates a verification result of the token; and return a decryption key to the first user side in a secure encryption manner.

The foregoing function modules may also be invoked by the client side application software in an API manner.

The foregoing system may further include a data storage server, and the data storage server includes:

a data distribution module, configured to: receive a request from the first client side; perform identity authentication on the first client side; and send ciphertext data to the first client side; and a data storage management module, configured to: receive a request from the second client side, and store a ciphertext of shared data; perform identity authentication on the second client side; securely store the ciphertext of the shared data; and notify the second client side that the ciphertext of the shared data is stored.

The foregoing function modules may also be invoked by the client side application software in an API manner.

Figure 6:
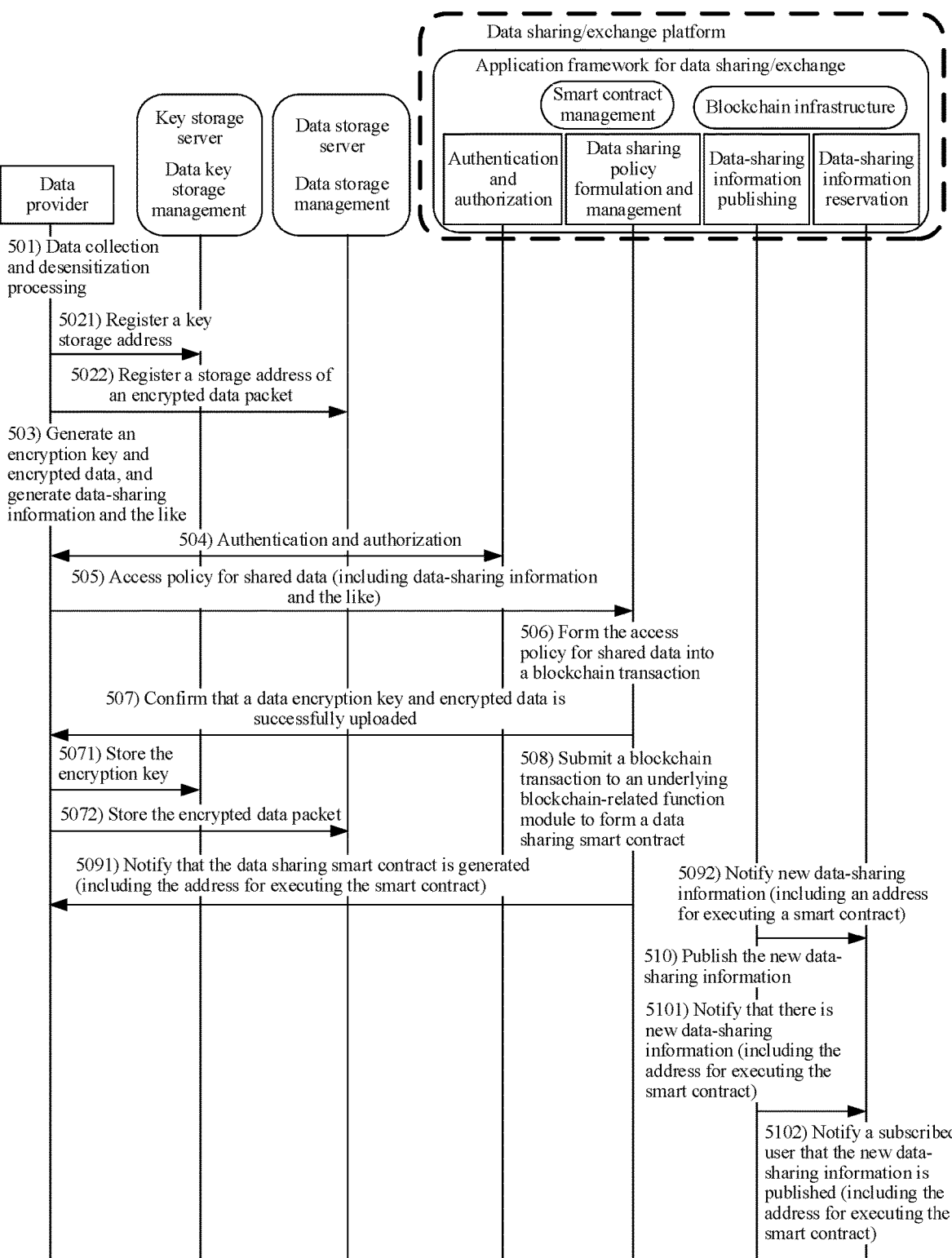
FIG. 6 is a first interaction flowchart according to an embodiment of this application.

Referring to FIG. 6, FIG. 6 shows an interaction procedure between a second client side and a server side, that is, a data publish procedure, including the following steps:

Step 501: A second client side collects raw data, and performs desensitization processing (for example, anonymity and deletion of sensitive information such as a bank card number and an account number) without affecting data sharing quality.

Step 502: The second client side registers with a local or remote server for to-be-shared data and an encryption key, specifically including:

Step 5021: Register with a key storage server for the to-be-stored encryption key to obtain an identifier and a storage address of the encryption key.

Step 5022: Register with a data storage server for the to-be-stored encrypted data to obtain an identifier and a storage address of the encrypted data.

Step 503: The second client side generates a data encryption key and a key identifier ID, encrypts the to-be-shared data by using the data encryption key to form a data ciphertext, and then generates data-sharing information for the to-be-shared data, such as an identity of a data publisher, a public key of the data publisher, a ciphertext identifier ID, an address stored in the ciphertext, a key identifier ID, an address stored in the key, which industry can use the data, which user can use the data, and other attributes of the data (for example, a category, a content abstract, a nature, a usage, and a price).

Step 504: Before publishing a data sharing policy, the second client side needs to perform mutual authentication with an authentication and authorization module of a server side in a digital certificate verification manner. After the authentication succeeds, the authentication and authorization module further needs to check whether the second client side has permission to publish data sharing.

After the authentication succeeds and authorization is obtained, the second client side needs to fill in the to-be-published data-sharing information according to a data sharing policy formulation and management module of the server side, such as an identity of a data publisher, a public key of the data publisher, a ciphertext identity ID, an address stored in the ciphertext, a key identity ID, an address stored in the ciphertext, which industry can use the data, which user can use the data, and others attribute of the data (for example, a category, a content abstract, a nature, a usage, and a price). The second client side forms a data sharing policy by using the data-sharing information and other information together, performs hash (Hash) processing on the data policy, and digitally signs the data policy by using a private key.

Step 505: The second client side sends the data sharing policy and the corresponding digital signature to the data sharing policy formulation and management module of the server side, where encryption and integrity protection need to be performed on information transmission.

Step 506: After receiving the data sharing policy and the corresponding digital signature from the second client side, the data sharing policy formulation and management module first verifies the digital signature, and then prepares to form a transaction in a block according to the data sharing policy and the digital signature.

Step 507: The data sharing policy formulation and management module and the second client side confirm whether the second client side stores the data encryption key in the key storage server, and stores the encrypted data in the data storage server. If no, the following operations are required:

Step 5071: The second client side stores the data encryption key in the key storage server.

Step 5072: The second client side stores the encrypted data in the data storage server.

It should be noted that there is no sequence of uploading the data encryption key and the encrypted data on the second client side, and the uploading needs to be completed only before a new blockchain transaction is generated.

Step 508: The data sharing policy formulation and management module performs hash processing on received one or more transactions and then digitally signs a hash value by using a private key of the data sharing policy formulation and management module, and then submits the one or more transactions and the digital signature to an underlying module blockchain infrastructure module and an underlying smart contract management module to form a new block, where the new block includes one or more data sharing smart contracts, and publishes the generated block to nodes of each blockchain network. How to load the transaction onto a link is determined by a specific implementation technology (for example, a Hyperledger Fabric platform or an Ethereum Quorum platform). Details are not described herein.

Step 509: The data sharing policy formulation and management module notifies a related party that a data sharing smart contract is generated.

Step 5091: Notify the second client side that the data sharing smart contract is generated, and send an address for executing the smart contract.

Step 5092: Notify a data-sharing information publishing module that the data sharing smart contract is generated, and notify corresponding new data-sharing information, where encryption and integrity protection need to be performed on information transmission.

Step 510: The data-sharing information publishing module receives a notification from the data sharing policy formulation and management module, and publishes new data-sharing information, including:

Step 5101: The data-sharing information publishing module notifies a data-sharing information reservation module that the data sharing smart contract is generated, where the notification includes the address for executing the smart contract and the new data-sharing information.

Step 5102: The data-sharing information reservation module receives the notification from the data-sharing information publishing module, and sends the address for executing the smart contract and the new data-sharing information to a subscribed user.

Figure 7:
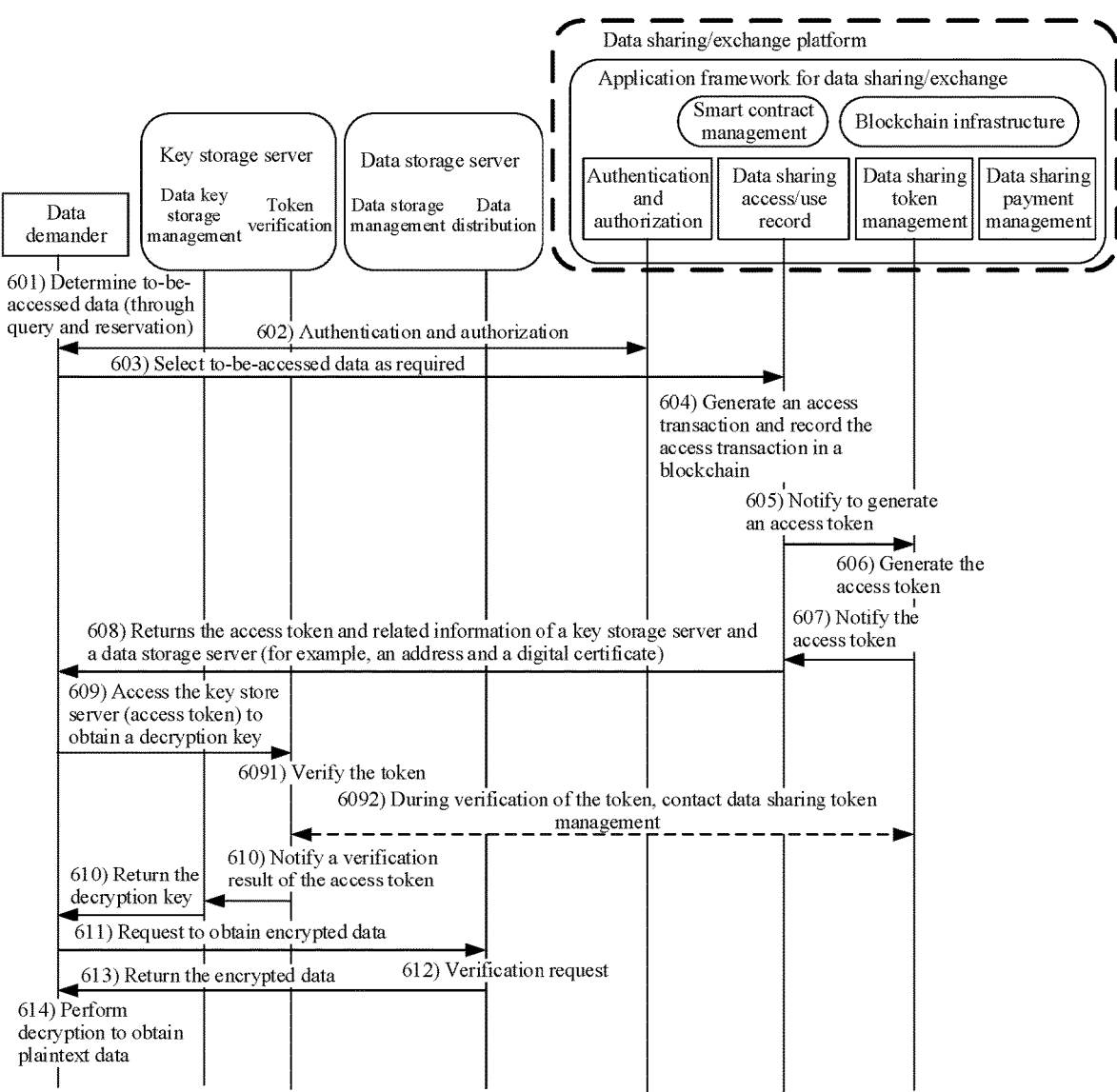
FIG. 7 is a second interaction flowchart according to an embodiment of this application.

Referring to FIG. 7, FIG. 7 shows an interaction procedure between a first client side and a server side, that is, a data access procedure, including the following steps:

Step 601: A first client side obtains, by searching an information publishing bar or reserving publishing information, or through other's recommendation, or by forwarding metadata of an encrypted data packet, an address of for executing a data sharing smart contract, and determines to-be-accessed data according to published data-sharing information (for example, an identity of a data publisher, an industry that can use the data, a user that can use the data, and other attributes of the data such as a category, a content abstract, a nature, a usage, and a price).

Step 602: Before executing the data sharing smart contract to access shared data, the first client side needs to perform mutual authentication with an authentication and authorization module of a data sharing/exchange platform, where a digital certificate is recommended for authentication. After the authentication succeeds, the authentication and authorization module further needs to check whether the data user has permission to access the shared data on the platform.

Step 603: After the authentication succeeds and authorization is obtained, the first client side sends identity information of the first client side (for example, an identity of a data user, a public key of the data user, and to-be-accessed data information (for example, an identity of a data publisher, a public key of the data publisher, a ciphertext identity ID, and a key identity ID)) and a digital signature of the first client side for the identity information and the to-be-accessed data information to a data sharing access record module of the data sharing/exchange platform.

Step 604: The data sharing access record module receives the identity information, the to-be-accessed data information, and the digital signature from the first client side, verifies the digital signature, and then executes a data sharing smart contract according to the data access request provided by the first client side, and checks whether the user meets a condition for accessing shared data (for example, which industry can use the data, and which user can use the data). If all policies of data sharing are met, the data sharing access record module forms a transaction in a block according to the received identity information of the data user, the to-be-accessed data information, and the digital signature. After performing hash processing on received one or more transactions, the data sharing access record module digitally signs a hash value by using a private key of the data sharing access record module, and then submits the one or more transactions and the digital signature to an underlying blockchain infrastructure module to form a new block, where the new block includes one or more records for accessing the shared data, and publishes the one or more records to nodes of each blockchain network. How the transaction is loaded onto a chain is determined by specific implementation technology (for example, a Hyperledger Fabric platform or an Ethereum Quorum platform). Details are not described herein.

Step 605: After the access record of the shared data is successfully uploaded to the link, the data sharing access record module notifies a data sharing token management module that an access token needs to be generated.

Step 606: The data sharing token management module receives a notification from the data sharing access record module, and generates an access token for this data access.

Step 607: The data sharing token management module sends the generated access token to the data sharing access record module.

Step 608: The data sharing access record module receives the access token from the data sharing token management module, and then sends the access token and related information (for example, an address and a digital certificate) of a key storage server and a data storage server to the first client side. Confidentiality protection and integrity protection need to be considered in a transmission process of the access token and the related information of the key storage server and the data storage server.

Step 609: The first client side receives a notification from the data sharing access record module, where the notification includes the access token and the related information of the key storage server and the data storage server (for example, the address and the digital certificate). Then, the first client side sends the access token to "Token verification" of the key storage server according to an address L stored in the key, to obtain a decryption key. Confidentiality protection and integrity protection need to be considered during transmission of the access token.

Step 6091: The token verification module of the key storage server receives the access token from the first client side, to verify validity of the access token. Optionally, during the token verification, the token verification module of the key storage server may need to communicate with the data sharing token management module. Confidentiality protection and integrity protection need to be considered during data communication.

Step 6092: The token verification module sends a verification result to a data key storage management module.

Step 610: The data key storage management module receives a verification result notification of the access token from the token verification module, and then returns a decryption key to the first client side in a secure encryption manner.

Step 611: The first client side receives the decryption key from the data key storage management module, and the first client side requests, according to the address stored in the ciphertext, to obtain data corresponding to the ciphertext identifier ID.

Step 612: A data distribution module receives a data ciphertext request from the first client side, and verifies the request from the first client side, for example, performs identity authentication.

Step 613: The data distribution module sends ciphertext data corresponding to the ciphertext identifier ID to the first client side.

Step 614: The first client side decrypts the ciphertext data according to the obtained data decryption key to obtain the to-be-accessed data.

In data sharing, a data provider may obtain some economic benefits from a data user. A specific process is shown in FIG. 8.

Figure 8:
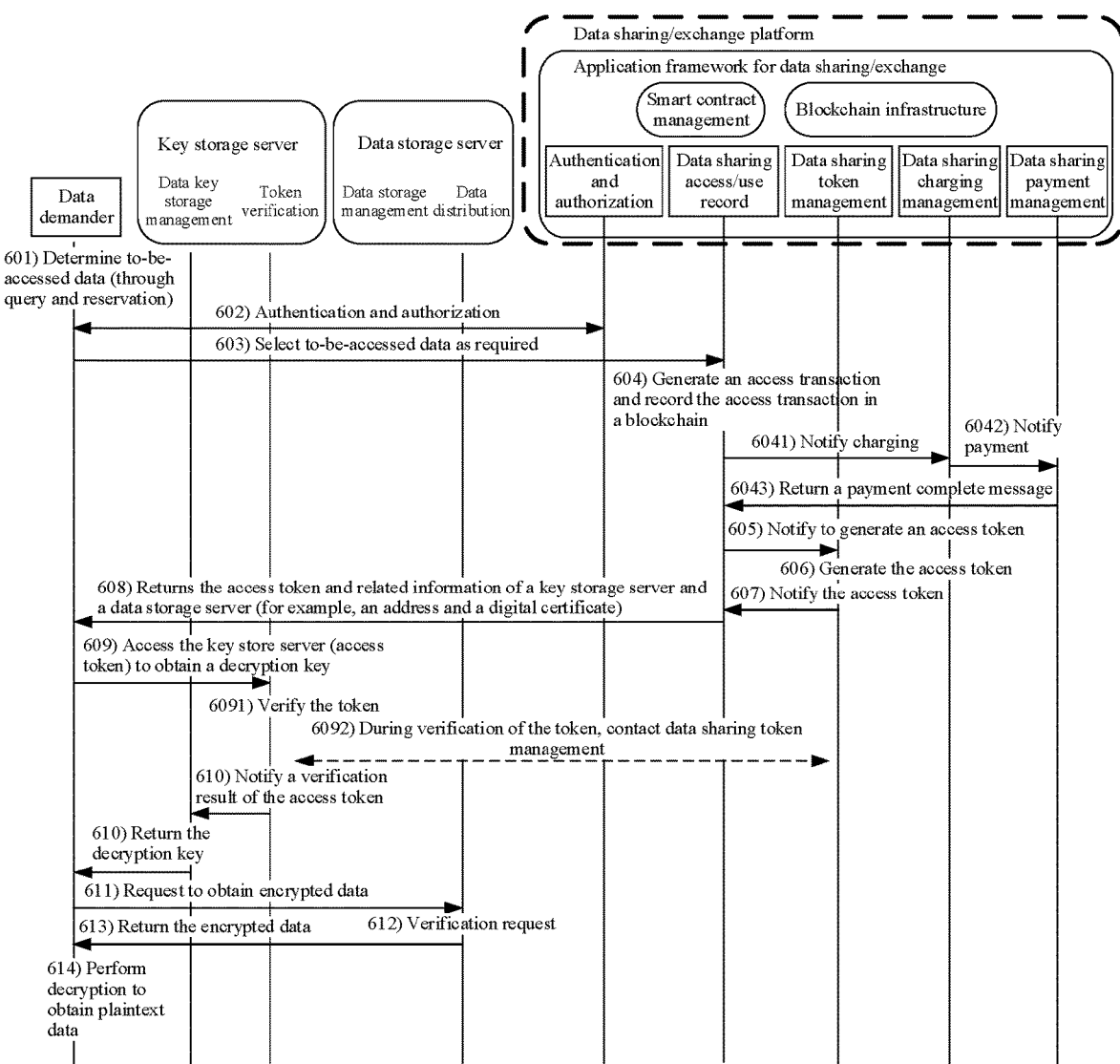
FIG. 8 is a third interaction flowchart according to an embodiment of this application.

In FIG. 8, step 604 further includes:

Step 6041: The data sharing access record module checks, according to a data sharing policy (for example, a price or a payment manner), whether the user meets a condition for accessing shared data (for example, which industry can use the data and which user can use the data). If all policies of data sharing are met, the data sharing access record module forms a blockchain transaction according to identity information of a data user, data information that needs to be accessed, and a digital signature, which is submitted to an underlying blockchain infrastructure module and an underlying smart contract management module, to form a record for accessing shared data, and a corresponding charging smart contract, which are released to nodes of each blockchain network.

Step 6042: The data sharing access record module notifies a data sharing charging management module that a new charging smart contract (including charging information) is generated. The data sharing charging management module generates a payment bill immediately or periodically according to the charging smart contract, and digitally signs the payment bill to form a transaction in a block. The data sharing charging management module digitally signs one or more payment bill transactions, and then the one or more transactions and the digital signature form a new block by using an underlying blockchain infrastructure module and an underlying smart contract management module. The new block includes one or more payment smart contracts, and the newly formed block is published to nodes of each blockchain network.

Step 6043: The data sharing charging management module notifies a data sharing payment management module that a new payment smart contract (including payment information) is generated. The data sharing payment management module immediately or periodically pays the payment bill according to the payment smart contract. After the payment is completed, the data sharing payment management module signs the payment information to form a payment transaction in a block. The data sharing payment management module digitally signs one or more payment transactions, and then forms a new block by using an underlying blockchain infrastructure module, where the new block includes one or more payment records, and publishes a newly formed block to nodes of each blockchain network.

The data sharing payment management module notifies the data sharing access record module that the payment is completed and that a next operation may be performed.

The data sharing system provided in this embodiment of this application is redesigned by using the prior art, that is, based on an existing open source blockchain platform (for example, Hyperledger Fabric or Ethereum Quorum), to improve system development efficiency, reliability, and stability. In addition, the foregoing data sharing system may be used as a data provider based on security protection for data transmission, security protection for data storage, and access control for data use, a personal user, an enterprise user, or the like, to securely share data according to a requirement and a policy. In addition, based on smart contract-based data sharing, an individual user or an enterprise user can automatically some compensation or benefits in quasi real time, thereby improving user experience while improving data sharing security.

It should be noted that the data sharing method provided in the embodiments of this application may be performed by a data sharing apparatus, or a control module that is in the data sharing apparatus and that is configured to perform the data sharing method. In the embodiments of this application, that the data sharing apparatus performs the data sharing method is used as an example to describe the data sharing apparatus provided in the embodiments of this application.

Figure 9:
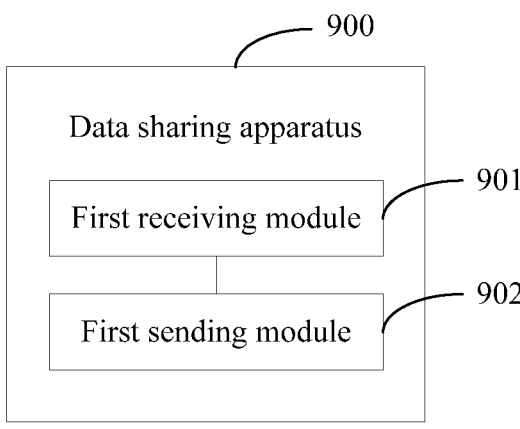
FIG. 9 is a first schematic structural diagram of a data sharing apparatus according to an embodiment of this application.

Referring to FIG. 9, an embodiment of this application provides a data sharing apparatus 900. The data sharing apparatus 900 is a server side, and the data sharing apparatus 900 includes:

a first receiving module 901, configured to receive a data access request sent by a first client side, where the data access request includes first data-sharing information, and the first data-sharing information is used to describe to-be-accessed data; and a first sending module 902, configured to send first storage information to the first client side in a case that the first client side meets a first access condition in a first smart contract, where the first smart contract belongs to a first block in a blockchain, and the first storage information is used to represent information that is corresponding to the to-be-accessed data and that is stored in a storage server.

In this embodiment of this application, the first receiving module 901 may receive the data access request sent by the first client side, and the first sending module 902 sends, according to the first data-sharing information carried in the data access request, the first storage information corresponding to the to-be-accessed data to the first client side in a case that the first client side meets the first access condition in the first smart contract. Because content stored in a block in the blockchain cannot be tampered with, the first smart contract included in the block has relatively high stability and security. In addition, the smart contract may output the first storage information by itself in a case that the first access condition is met, thereby avoiding a security risk that a third-party platform intervenes in data sharing and improving data sharing security.

Optionally, the data access request further includes identity information of the first client side and a digital signature of the first client side, and the apparatus further includes:
a first generation module, configured to: in a case that the first client side meets the first access condition in the first smart contract, generate a second block according to the identity information of the first client side, the first data-sharing information, and the digital signature of the first client side, where the second block includes an access record corresponding to the to-be-accessed data.

Optionally, the first storage information includes first key information and first address information, and the first sending module 902 includes:
a first generation unit, configured to: in a case that the first client side meets the first access condition in the first smart contract, generate the first key information corresponding to the to-be-accessed data, and obtain the first address information; and
a first sending unit, configured to send the first key information and the first address information to the first client side, where
the first key information is used to obtain an access permission of the storage server, and the first address information is used to indicate a storage address of the to-be-accessed data.

Optionally, the data access request further includes identity information of the first client side and a digital signature of the first client side, and the apparatus further includes:
a second generation module, configured to: in a case that the first client side meets the first access condition in the first smart contract, generate a third block according to the identity information of the first client side, the first data-sharing information, and the digital signature of the first client side, where the third block includes a second smart contract, and the second smart contract is associated with the first smart contract and is used to instruct to send the first storage information to the first client side in a case that payment information sent by the first client side is received;
a second sending module, configured to send billing information associated with the to-be-accessed data to the first client side; and
a third generation module, configured to: after the payment information sent by the first client side is received, generate a fourth block according to the payment information and the digital signature of the first client side, where the fourth block includes a payment record corresponding to the payment information; and
the first sending module 902 includes:
a second sending unit, configured to send the first storage information to the first client side in a case that the first client side meets the first access condition in the first smart contract and the payment information sent by the first client side is received.

Figure 10:
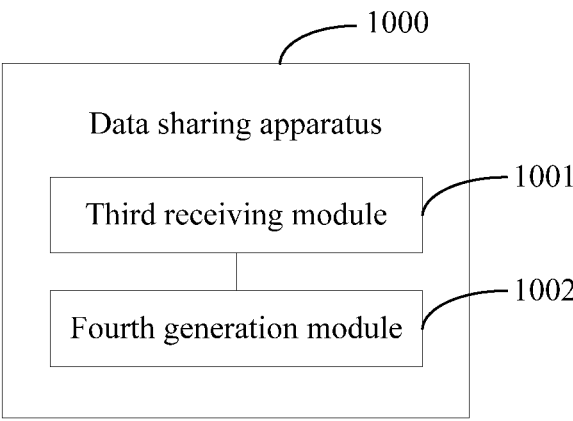
FIG. 10 is a second schematic structural diagram of a data sharing apparatus according to an embodiment of this application.

Referring to FIG. 10, an embodiment of this application further provides a data sharing apparatus 1000. The data sharing apparatus 1000 is a server side, and the data sharing apparatus 1000 includes:

a third receiving module 1001, configured to receive a data sharing request sent by a second client side, where the data sharing request includes second data-sharing information and a digital signature of the second client side, and the second data-sharing information is used to describe to-be-shared data; and
a fourth generation module 1002, configured to generate a fifth block according to the second data-sharing information and the digital signature of the second client side, where the fifth block includes a third smart contract, the third smart contract is used to instruct to output second storage information in a case that a second access condition in the third smart contract is met, and the second storage information is used to represent information that is corresponding to the to-be-shared data and that is stored in a storage server.

In this embodiment of this application, the third receiving module 1001 receives the data sharing request sent by the second client side, and the fourth generating module 1002 generates the fifth block according to the second data-sharing information and the digital signature of the second client side that are carried in the data sharing request, where the fifth block includes the third smart contract that may output the second storage information corresponding to the to-be-shared data in a case that the second access condition in the third smart contract is met, so that a data demander obtains and uses the to-be-shared data. Because content stored in a block in the blockchain cannot be tampered with, the third smart contract included in the block has relatively high stability and security. In addition, the smart contract may output the second storage information by itself in a case that the access condition is met, thereby avoiding a security risk that a third-party platform intervenes in data sharing and improving data sharing security.

Optionally, the apparatus further includes:
a fifth generation module, configured to generate second address information used to indicate the third smart contract; and
a third sending module, configured to send the second data-sharing information and the second address information to a subscribed client side.

Figure 11:
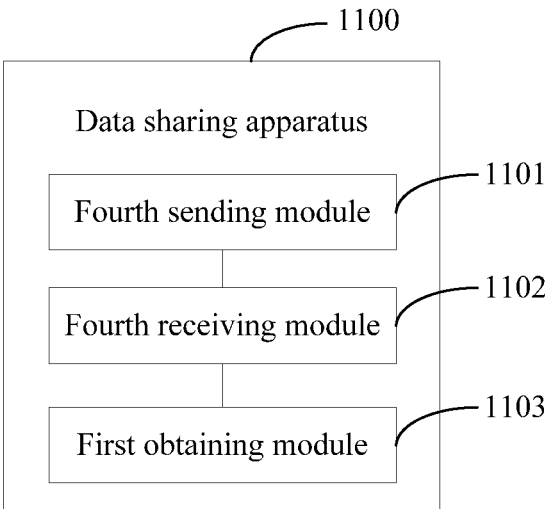
FIG. 11 is a third schematic structural diagram of a data sharing apparatus according to an embodiment of this application.

Referring to FIG. 11, an embodiment of this application further provides a data sharing apparatus 1100. The data sharing apparatus 1100 is a first client side, and the data sharing apparatus 1100 includes:
a fourth sending module 1101, configured to send a data access request to a server side, where the data access request includes first data-sharing information, and the first data-sharing information is used to describe to-be-accessed data;
a fourth receiving module 1102, configured to receive first storage information that is of the to-be-accessed data and that is sent by the server side based on a first smart contract, where the first smart contract belongs to a first block in a blockchain, and the first storage information is used to represent information that is corresponding to the to-be-accessed data and that is stored in a storage server; and
a first obtaining module 1103, configured to obtain the to-be-accessed data according to the first storage information.

In this embodiment of this application, the fourth sending module 1101 may send the data access request to the server side, and the fourth receiving module 1102 receives the first storage information that is of the to-be-accessed data and that is sent by the server side based on the first smart contract. The first obtaining module 1103 obtains the to-beaccessed data according to the first storage information. Because content stored in a block in the blockchain cannot be tampered with, the first smart contract has relatively high stability and security. In addition, the first smart contract may output the first storage information by itself in a case that the access condition is met, thereby avoiding a security risk that a third-party platform intervenes in data sharing and improving data sharing security.

Optionally, the first storage information includes first key information and first address information, and the first obtaining module 1103 includes:

a first obtaining unit, configured to obtain second key information in a case that the first key information is authenticated by the storage server;

a second obtaining unit, configured to obtain encrypted to-be-accessed data according to the first address information; and a decryption unit, configured to decrypt the encrypted to-be-accessed data by using the second key information, to obtain the to-be-accessed data.

Optionally, the apparatus further includes:

a fifth receiving module, configured to receive billing information sent by the server side; and a fifth sending module, configured to perform a payment operation based on the billing information, and send payment information to the server side.

Figure 12:
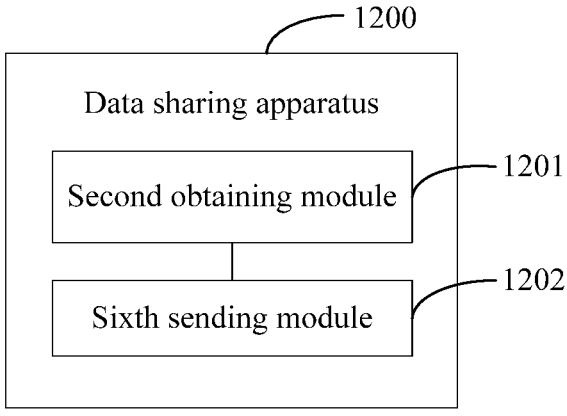
FIG. 12 is a fourth schematic structural diagram of a data sharing apparatus according to an embodiment of this application.

Referring to FIG. 12, an embodiment of this application further provides a data sharing apparatus 1200. The data sharing apparatus 1200 is a second client side, and the data sharing apparatus 1200 includes:

a second obtaining module 1201, configured to obtain second storage information of to-be-shared data in a storage server, where the second storage information is used to represent information corresponding to the to-be-shared data in the storage server; and a sixth sending module 1202, configured to send a data sharing request to a server side, where the data sharing request includes second data-sharing information, and the second data-sharing information is generated based on the second storage information and is used to describe the to-be-shared data.

In this embodiment of this application, after the second obtaining module 1201 obtains the second storage information of the to-be-shared data in the storage server, the sixth sending module 1202 may send the data sharing request to the server side. Because the data sharing request includes the second data-sharing information used to describe the to-be-shared data, the server side may create a block according to the second data-sharing information, to implement data sharing by using a blockchain technology, thereby improving data sharing security.

Optionally, the second storage information includes third key information and third address information, and the apparatus further includes:

an encryption module, configured to encrypt the to-be-shared data by using the third key information; and an uploading module, configured to upload the third key information and encrypted to-be-shared data to the storage server, where the third address information is used to indicate a storage address of the to-be-shared data.

The data sharing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in this embodiment of this application.

The data sharing apparatus in this embodiment of this application may be an apparatus with an operating system. The operating system may be an Android operating system, an iOS operating system, or another possible operating system. This is not specifically limited in this embodiment of this application.

The data sharing apparatus provided in this embodiment of this application can implement the processes implemented in the method embodiments in FIG. 1 to FIG. 8. To avoid repetition, details are not described herein again.

Figure 13:
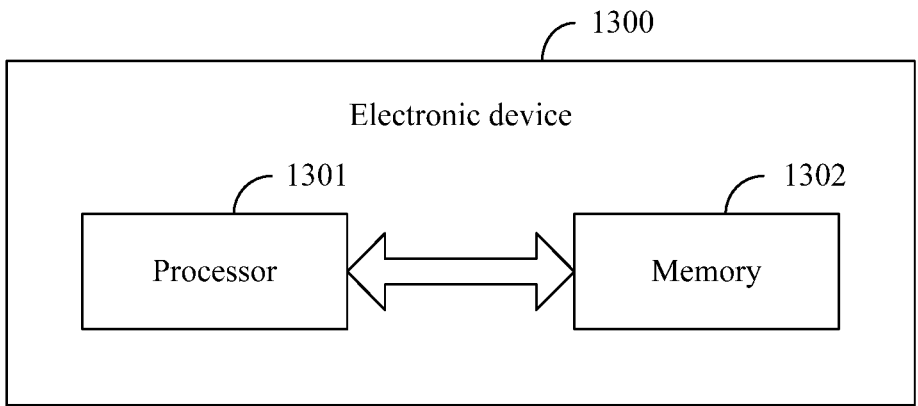
FIG. 13 is a first schematic structural diagram of an electronic device according to an embodiment of this application.

Optionally, as shown in FIG. 13, an embodiment of this application further provides an electronic device 1300, including a processor 1301, a memory 1302, and a program or an instruction that is stored in the memory 1302 and that can be run on the processor 1301. When the program or the instruction is executed by the processor 1301, the processes of the foregoing data sharing method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 14:
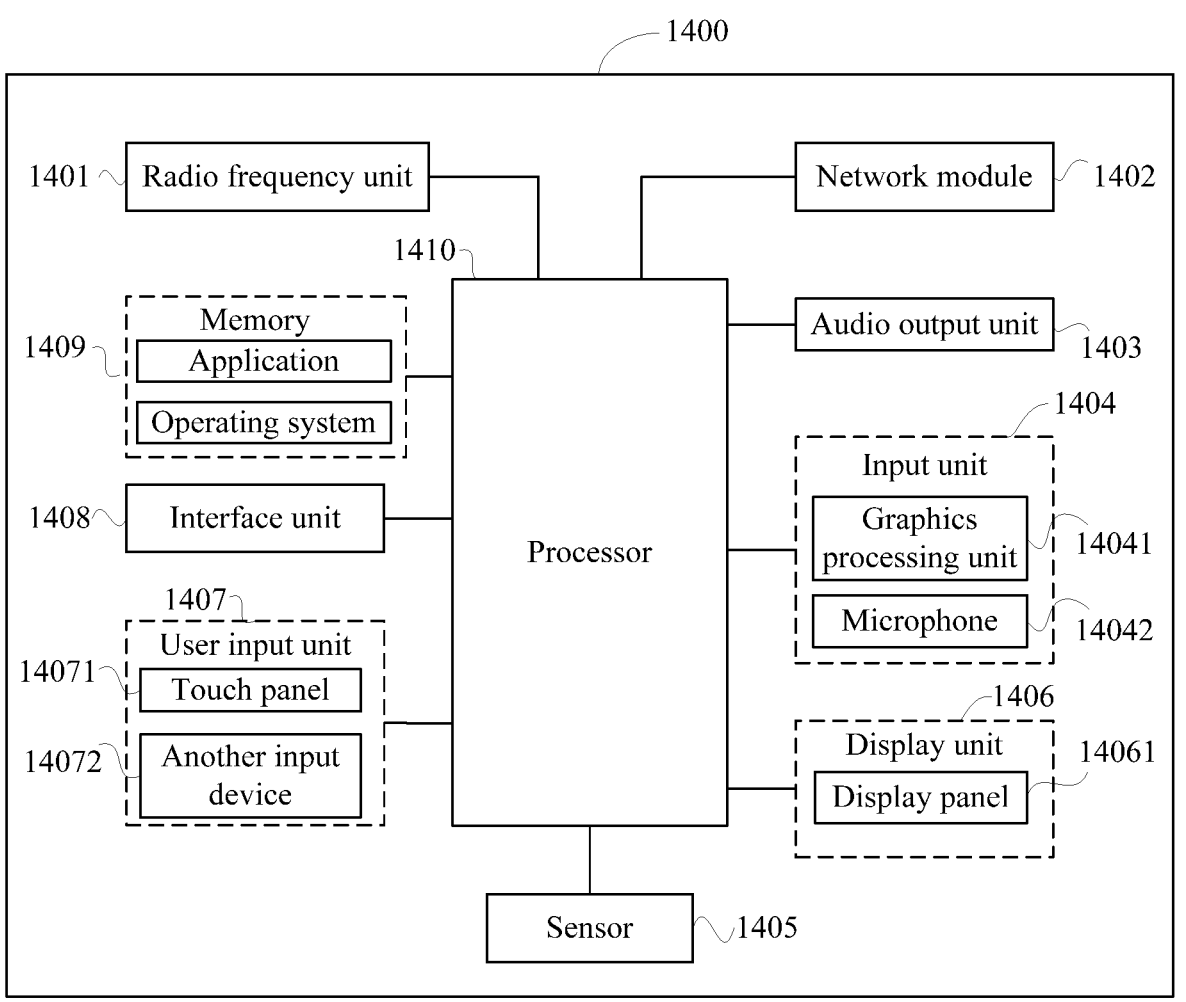
FIG. 14 is a second schematic structural diagram of an electronic device according to an embodiment of this application.

FIG. 14 is a schematic diagram of a hardware structure of an electronic device according to an embodiment of this application.

An electronic device 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art can understand that the electronic device 1400 may further include a power supply (for example, a battery) that supplies power to each component. The power supply may be logically connected to the processor 1410 by using a power supply management system, to implement functions such as charging and discharging management, and power consumption management by using the power supply management system. The structure of the electronic device shown in FIG. 14 does not constitute a limitation on the electronic device. The electronic device may include components more or fewer than those shown in the diagram, a combination of some components, or different component arrangements. Details are not described herein.

The radio frequency unit 1401 is configured to receive a data access request sent by a first client side, where the data access request includes first data-sharing information, and the first data-sharing information is used to describe to-be-accessed data; and the radio frequency unit 1401 is further configured to send first storage information to the first client side in a case that the first client side meets a first access condition in a first smart contract, where the first smart contract belongs to a first block in a blockchain, and the first storage information is used to represent information that is corresponding to the to-be-accessed data and that is stored in a storage server.

Optionally, the data access request further includes identity information of the first client side and a digital signature of the first client side. The processor 1410 is configured to: in a case that the first client side meets the first access condition in the first smart contract, generate a second block according to the identity information of the first client side, the first data-sharing information, and the digital signature of the first client side, where the second block includes an access record corresponding to the to-be-accessed data.

Optionally, the first storage information includes first key information and first address information. The processor 1410 is further configured to: in a case that the first client side meets the first access condition in the first smart contract, generate the first key information corresponding to the to-be-accessed data, and obtain the first address information; and send the first key information and the first address information to the first client side, where the first key information is used to obtain an access permission of the storage server, and the first address information is used to indicate a storage address of the to-be-accessed data.

Optionally, the data access request further includes identity information of the first client side and a digital signature of the first client side, and the processor 1410 is further configured to:

in a case that the first client side meets the first access condition in the first smart contract, generate a third block according to the identity information of the first client side, the first data-sharing information, and the digital signature of the first client side, where the third block includes a second smart contract, and the second smart contract is associated with the first smart contract and is used to instruct to send the first storage information to the first client side in a case that payment information sent by the first client side is received;

the radio frequency unit 1401 is further configured to send billing information associated with the to-be-accessed data to the first client side; and the processor 1410 is further configured to: after the payment information sent by the first client side is received, generate a fourth block according to the payment information and the digital signature of the first client side, where the fourth block includes a payment record corresponding to the payment information.

The radio frequency unit 1401 is further configured to send the first storage information to the first client side in a case that the first client side meets the first access condition in the first smart contract and the payment information sent by the first client side is received.

Alternatively, the radio frequency unit 1401 is configured to receive a data sharing request sent by a second client side, where the data sharing request includes second data-sharing information and a digital signature of the second client side, and the second data-sharing information is used to describe to-be-shared data; and the processor 1410 is configured to generate a fifth block according to the second data-sharing information and the digital signature of the second client side, where the fifth block includes a third smart contract, the third smart contract is used to instruct to output second storage information in a case that a second access condition in the third smart contract is met, and the second storage information is used to represent information that is corresponding to the to-be-shared data and that is stored in a storage server.

Optionally, the processor 1410 is further configured to:
generate second address information used to indicate the third smart contract; and
the radio frequency unit 1401 is further configured to:
send the second data-sharing information and the second address information to a subscribed client side.

Alternatively, the radio frequency unit 1401 is configured to:
send a data access request to a server side, where the data access request includes first data-sharing information, and the first data-sharing information is used to describe to-be-accessed data;
receive first storage information that is of the to-be-accessed data and that is sent by the server side based on a first smart contract, where the first smart contract belongs to a first block in a blockchain, and the first storage information is used to represent information that is corresponding to the to-be-accessed data and that is stored in a storage server; and
the processor 1410 is configured to obtain the to-be-accessed data according to the first storage information.

Optionally, the processor 1410 is further configured to:
obtain second key information in a case that the first key information is authenticated by the storage server;
obtain encrypted to-be-accessed data according to the first address information; and
decrypt the encrypted to-be-accessed data by using the second key information, to obtain the to-be-accessed data.

Optionally, the radio frequency unit 1401 is further configured to:
receive billing information sent by the server side; and
the processor 1410 is further configured to perform a payment operation based on the billing information, and the radio frequency unit 1401 is further configured to send payment information to the server side.

Alternatively, the processor 1410 is configured to:
obtain second storage information of to-be-shared data in a storage server, where the second storage information is used to represent information corresponding to the to-be-shared data in the storage server; and
the radio frequency unit 1401 is configured to:
send a data sharing request to a server side, where the data sharing request includes second data-sharing information, and the second data-sharing information is generated based on the second storage information and is used to describe the to-be-shared data.

Optionally, the second storage information includes third key information and third address information, and the processor 1410 is further configured to:
encrypt the to-be-shared data by using the third key information; and
upload the third key information and encrypted to-be-shared data to the storage server, where
the third address information is used to indicate a storage address of the to-be-shared data.

The foregoing electronic device can implement the processes in the foregoing data sharing method embodiment, and can achieve a same technical effect. To avoid repetition, details are not described herein again.

It should be understood that, in this embodiment of this application, the input unit 1404 may include a graphics processing unit (GPU) 14041 and a microphone 14042, and the graphics processing unit 14041 processes image data of a still picture or a video obtained by an image capture apparatus (for example, a camera) in a video capture mode or an image capture mode. The display unit 1406 may include a display panel 14061. Optionally, the display panel 14061 may be configured in a form such as a liquid crystal display or an organic light-emitting diode. The user input unit 1407 includes a touch panel 14071 and another input device 14072. The touch panel 14071 is also referred to as a touchscreen. The touch panel 14071 may include two parts: a touch detection apparatus and a touch controller. The another input device 14072 may include but is not limited to a physical keyboard, a functional button (for example, a volume control button or a power on/off button), a trackball, a mouse, and a joystick. Details are not described herein. The memory 1409 may be configured to store a software program and various data, including but not limited to an application and an operating system. An application processor and a modem processor may be integrated into the processor 1410, the application processor mainly processes an operating system, a user interface, an application, and the like, and the modem processor mainly processes wireless communication. It can be understood that, alternatively, the modem processor may not be integrated into the processor 1410.

An embodiment of this application further provides a readable storage medium. The readable storage medium stores a program or an instruction, and the program or the instruction is executed by a processor to implement the processes of the foregoing data sharing method embodiment, and a same technical effect can be achieved. To avoid repetition, details are not described herein again.

The processor is a processor in the electronic device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing data sharing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (for example, a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A data sharing method, wherein the method is applied to a server side and comprises:

receiving a data access request sent by a first client side, wherein the data access request comprises first data-sharing information, and the first data-sharing information is used to describe to-be-accessed data; and sending first storage information to the first client side in a case that the first client side meets a first access condition in a first smart contract, wherein the first smart contract belongs to a first block in a blockchain, and the first storage information is used to represent information that is corresponding to the to-be-accessed data and that is stored in a storage server, wherein the data access request further comprises identity information of the first client side and a digital signature of the first client side, and before the step of sending first storage information to the first client side, the method further comprises:

in a case that the first client side meets the first access condition in the first smart contract, generating a third block in the blockchain according to the identity information of the first client side, the first data-sharing information, and the digital signature of the first client side, wherein the third block comprises a second smart contract, and the second smart contract is associated with the first smart contract and is used to instruct to send the first storage information to the first client side in a case that payment information sent by the first client side is received;

sending billing information associated with the to-be-accessed data to the first client side; and after the payment information sent by the first client side is received, generating a fourth block in the blockchain according to the payment information and the digital signature of the first client side, wherein the fourth block comprises a payment record corresponding to the payment information; and the sending first storage information to the first client side in a case that the first client side meets a first access condition in a first smart contract comprises:

sending the first storage information to the first client side in a case that the first client side meets the first access condition in the first smart contract and the payment information sent by the first client side is received.

2. The method according to claim 1, wherein the data access request further comprises identity information of the first client side and a digital signature of the first client side, and before the step of sending first storage information to the first client side, the method further comprises:

in a case that the first client side meets the first access condition in the first smart contract, generating a second block according to the identity information of the first client side, the first data-sharing information, and the digital signature of the first client side, wherein the second block comprises an access record corresponding to the to-be-accessed data.

3. The method according to claim 1, wherein the first storage information comprises first key information and first address information, and the sending first storage information to the first client side in a case that the first client side meets a first access condition in a first smart contract comprises:

in a case that the first client side meets the first access condition in the first smart contract, generating the first key information corresponding to the to-be-accessed data, and obtaining the first address information; and sending the first key information and the first address information to the first client side, wherein the first key information is used to obtain an access permission of the storage server, and the first address information is used to indicate a storage address of the to-be-accessed data.

4. A server side, comprising a processor, a memory, and a program or an instruction that is stored in the memory and that can be run on the processor, wherein the program or the instruction is executed by the processor to:

receive a data access request sent by a first client side, wherein the data access request comprises first data-sharing information, and the first data-sharing information is used to describe to-be-accessed data; and send first storage information to the first client side in a case that the first client side meets a first access condition in a first smart contract, wherein the first smart contract belongs to a first block in a blockchain, and the first storage information is used to represent information that is corresponding to the to-be-accessed data and that is stored in a storage server, wherein the data access request further comprises identity information of the first client side and a digital signature of the first client side, and wherein the processor is further caused to:

in a case that the first client side meets the first access condition in the first smart contract, generate a third block in the blockchain according to the identity information of the first client side, the first data-sharing information, and the digital signature of the first client side, wherein the third block comprises a second smart contract, and the second smart contract is associated with the first smart contract and is used to instruct to send the first storage information to the first client side in a case that payment information sent by the first client side is received;

send billing information associated with the to-be-accessed data to the first client side; and after the payment information sent by the first client side is received, generate a fourth block in the blockchain according to the payment information and the digital signature of the first client side, wherein the fourth block comprises a payment record corresponding to the payment information; and wherein the processor is further caused to:

send the first storage information to the first client side in a case that the first client side meets the first access condition in the first smart contract and the payment information sent by the first client side is received.

5. The server side according to claim 4, wherein the data access request further comprises identity information of the first client side and a digital signature of the first client side, and the program or the instruction is further executed by the processor to implement:

before the step of sending first storage information to the first client side, in a case that the first client side meets the first access condition in the first smart contract, generating a second block according to the identity information of the first client side, the first data-sharing information, and the digital signature of the first client side, wherein the second block comprises an access record corresponding to the to-be-accessed data.

6. The server side according to claim 4, wherein the first storage information comprises first key information and first address information, and the sending first storage information to the first client side in a case that the first client side meets a first access condition in a first smart contract comprises:

in a case that the first client side meets the first access condition in the first smart contract, generating the first key information corresponding to the to-be-accessed data, and obtaining the first address information; and sending the first key information and the first address information to the first client side, wherein the first key information is used to obtain an access permission of the storage server, and the first address information is used to indicate a storage address of the to-be-accessed data.

7. The server side according to claim 4, wherein the data access request further comprises identity information of the first client side and a digital signature of the first client side, and the program or the instruction is further executed by the processor to implement:

before the step of sending first storage information to the first client side, in a case that the first client side meets the first access condition in the first smart contract, generating a third block according to the identity information of the first client side, the first data-sharing information, and the digital signature of the first client side, wherein the third block comprises a second smart contract, and the second smart contract is associated with the first smart contract and is used to instruct to send the first storage information to the first client side in a case that payment information sent by the first client side is received;

sending billing information associated with the to-be-accessed data to the first client side; and after the payment information sent by the first client side is received, generating a fourth block according to the payment information and the digital signature of the first client side, wherein the fourth block comprises a payment record corresponding to the payment information; and the sending first storage information to the first client side in a case that the first client side meets a first access condition in a first smart contract comprises:

sending the first storage information to the first client side in a case that the first client side meets the first access condition in the first smart contract and the payment information sent by the first client side is received.

\* \* \* \* \*